(12) United States Patent
Hwang et al.

(10) Patent No.: US 12,245,087 B2
(45) Date of Patent: Mar. 4, 2025

(54) METHOD AND APPARATUS FOR PERFORMING CELL ACCESS WITHOUT RANDOM ACCESS IN NEXT GENERATION WIRELESS COMMUNICATION SYSTEM

(71) Applicant: Samsung Electronics Co., Ltd., Gyeonggi-do (KR)

(72) Inventors: June Hwang, Gyeonggi-do (KR); Soenghun Kim, Gyeonggi-do (KR); Himke Van Der Velde, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 443 days.

(21) Appl. No.: 17/427,789

(22) PCT Filed: Feb. 14, 2020

(86) PCT No.: PCT/KR2020/002095
§ 371 (c)(1),
(2) Date: Aug. 2, 2021

(87) PCT Pub. No.: WO2020/167016
PCT Pub. Date: Aug. 20, 2020

(65) Prior Publication Data
US 2022/0132380 A1  Apr. 28, 2022

(30) Foreign Application Priority Data
Feb. 14, 2019  (KR) ........................ 10-2019-0017188

(51) Int. Cl.
*H04W 36/00*  (2009.01)
*H04W 72/044*  (2023.01)
*H04W 72/23*  (2023.01)

(52) U.S. Cl.
CPC . *H04W 36/0077* (2013.01); *H04W 36/00725* (2023.05); *H04W 72/044* (2013.01); *H04W 72/23* (2023.01)

(58) Field of Classification Search
CPC ......... H04W 36/0077; H04W 36/0072; H04W 72/044; H04W 72/23; H04W 72/20; H04W 72/0453; H04W 8/26
See application file for complete search history.

(56) References Cited

U.S. PATENT DOCUMENTS 10,694,569 B2   6/2020  Jin et al.
2016/0381611 A1  12/2016 Uchino et al.
(Continued)

FOREIGN PATENT DOCUMENTS

| CN | 107637121 | 1/2018 |
| CN | 109151903 | 1/2019 |
| WO | WO 2018/063443 | 4/2018 |

OTHER PUBLICATIONS

PCT/ISA/210 Search Report issued on PCT/KR2020/002095, May 27, 2020, pp. 5.
(Continued)

*Primary Examiner* — Ricardo H Castaneyra
(74) *Attorney, Agent, or Firm* — The Farrell Law Firm, P.C.

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety (Continued)

services. The present disclosure relates to handover performed without random access in a wireless communication system.

8 Claims, 10 Drawing Sheets

(56) References Cited

U.S. PATENT DOCUMENTS

| | | | |
|---|---|---|---|
| 2018/0014230 A1 | 1/2018 | Dalsgaard et al. | |
| 2018/0020382 A1* | 1/2018 | Kim | H04W 48/02 |
| 2018/0049079 A1* | 2/2018 | Ozturk | H04W 36/08 |
| 2018/0092118 A1 | 3/2018 | Kim et al. | |
| 2018/0279185 A1 | 9/2018 | Wu | |
| 2019/0297537 A1* | 9/2019 | Tsai | H04W 36/0016 |
| 2019/0357092 A1* | 11/2019 | Jung | H04W 36/0055 |
| 2020/0389886 A1* | 12/2020 | Lee | H04W 76/27 |

OTHER PUBLICATIONS

PCT/ISA/237 Written Opinion issued on PCT/KR2020/002095, May 27, 2020, pp. 4.
Zte Corporation, 'Introduction of preallocated uplink grant in MAC', R2-1702176, 3GPP TSG-RAN2 Meeting #97, Athens, Greece, Feb. 20, 2017, pp. 16.
'3GPP, TSG RAN' NR; RRC protocol specification (Release 15)', 3GPP TS 38.331 V15.4.0, Jan. 14, 2019, pp. 476.
Chinese Office Action dated Mar. 1, 2024 issued in counterpart application No. 202080021158.0, 36 pages.
Korean Office Action dated May 1, 2024 issued in counterpart application No. 10-2019-0017188, 10 pages.
Chinese Office Action dated Sep. 29, 2024 issued in counterpart application No. 202080021158.0, 12 pages.
Chinese Office Action dated Jan. 13, 2025 issued in counterpart appllication No. 202080021158.0, 9 pages.

* cited by examiner

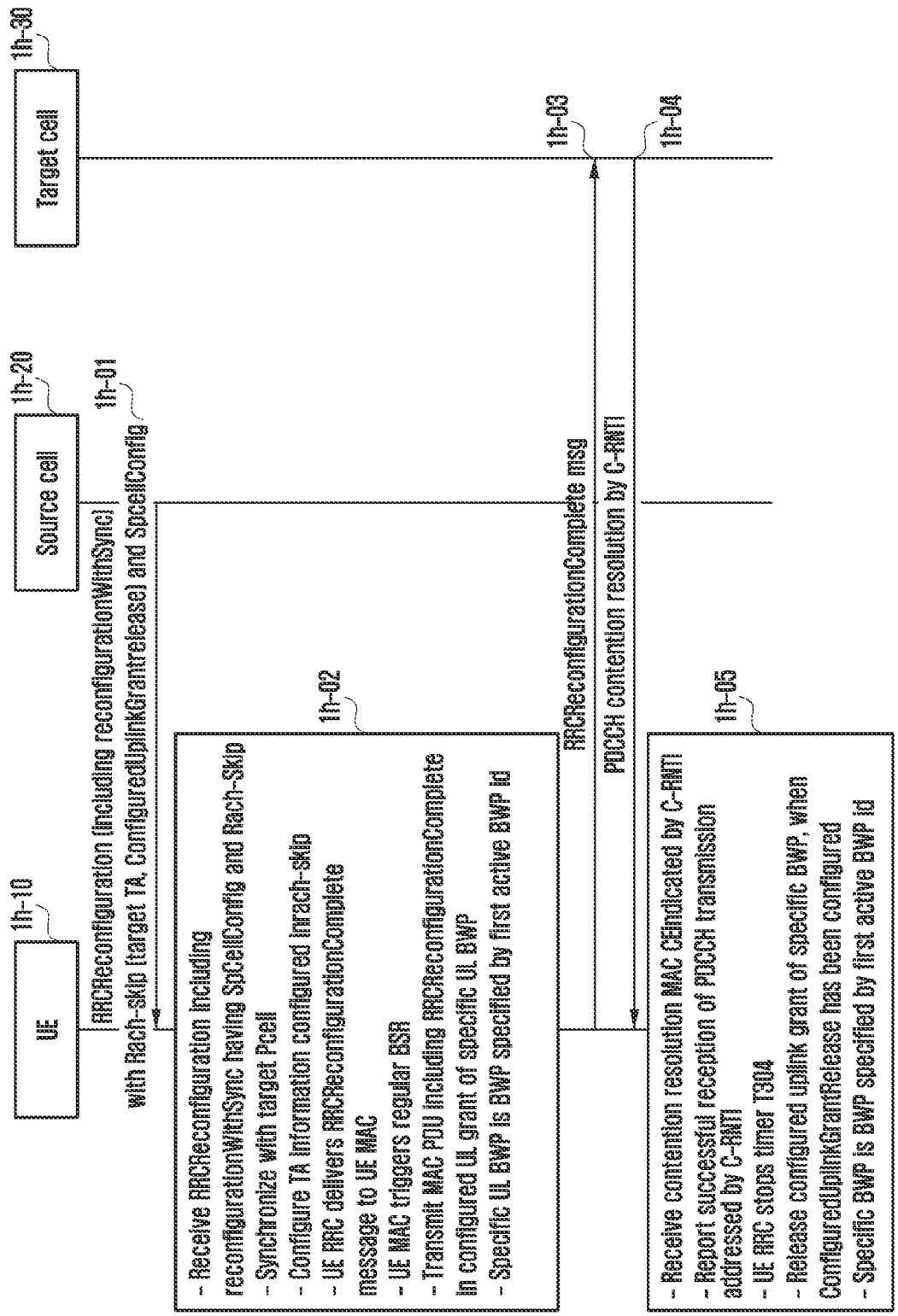

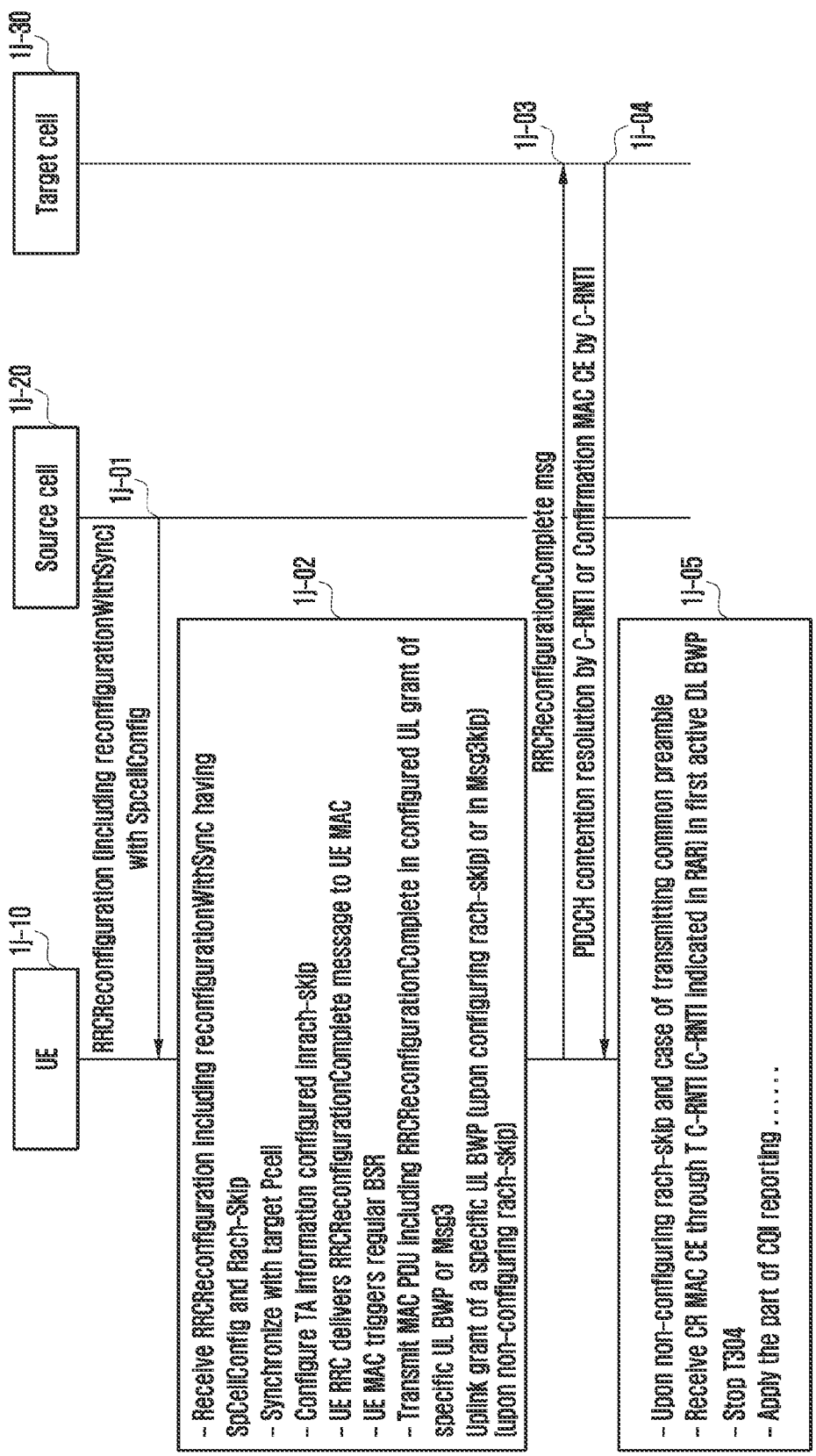

METHOD AND APPARATUS FOR PERFORMING CELL ACCESS WITHOUT RANDOM ACCESS IN NEXT GENERATION WIRELESS COMMUNICATION SYSTEM

PRIORITY

This application is a National Phase Entry of PCT International Application No. PCT/KR2020/002095, which was filed on Feb. 14, 2020, and claims priority to Korean Patent Application No. 10-2019-0017188, which was filed on Feb. 14, 2019, the content of each of which is incorporated herein by reference.

TECHNICAL FIELD

The disclosure relates to handover performing without random access in a wireless communication system.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications. In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

As various services can be provided according to the above-mentioned description and the development of mobile communication systems, a method for effectively providing these services is required.

DISCLOSURE OF INVENTION

Technical Problem

The disclosure provides a device and method for effectively providing a service in a mobile communication system. According to an embodiment of the disclosure, there is a need for a method for a (User Equipment) UE to receive resource allocation in a target cell for performing rachless handover, and UL signal transmission required for access may be performed by using a configured grant UL configured in the existing bandwidth part.

Solution to Problem

Technical problems to be achieved in the embodiment of the disclosure are not limited to the technical problems mentioned above, and other technical problems not mentioned will be clearly understood by those of ordinary skill in the art to which the disclosure belongs from the description below.

According to an embodiment of the disclosure, a method performed by a UE in a wireless communication system comprises receiving, from a base station, a first radio resource control (RRC) message including first information for performing cell access without random access and second information on cell configuration information; transmitting, to the base station, a second RRC message using uplink grant configured in a specific bandwidth part (BWP); and receiving, from the base station, a medium access control (MAC) control element (CE) indicating contention resolution by a cell radio network temporary identifier (C-RNTI) indicated in the first message, wherein the specific BWP is determined by the second information.

In some embodiments, the first information includes at least one of target timing advance (TA) information or information for releasing uplink grant configured in a specific BWP.

In some embodiments, when the first information comprises information for releasing uplink grant configured in the specific BWP, the method further comprises releasing uplink grant configured in the specific BWP after transmitting the second RRC message.

In some embodiments, when the first information comprises target TA information, the TA information comprises at least one of Ta-0, PTAG, or STAG-Id.

According to another embodiment of the disclosure, a method performed by a base station in a wireless communication system comprises transmitting, to a UE, a first radio resource control (RRC) message including first information for performing cell access without random access and second information on cell configuration information; receiving, from the UE, a second RRC message using uplink grant configured in a specific bandwidth part (BWP); and transmitting, to the terminal, a medium access control (MAC) control element (CE) indicating contention resolution by a cell radio network temporary identifier (C-RNTI) indicated in the first message, wherein the specific BWP is determined by the second information. According to another embodiment of the disclosure, a UE comprises a transceiver configured to transmit and receive at least one signal; and a controller coupled to the transceiver, wherein the controller is configured to receive, from a base station, a first radio resource control (RRC) message including first information for performing cell access without random access and second information on cell configuration information, to transmit, to the base station, a second RRC message using uplink grant configured in a specific bandwidth part (BWP), and to receive, from the base station, a medium access control (MAC) control element (CE) indicating contention resolution by a cell radio network temporary identifier (C-RNTI) indicated in the first message, and wherein the specific BWP is determined by the second information.

According to another embodiment of the disclosure, a base station comprises a transceiver configured to transmit and receive at least one signal; and a controller coupled to the transceiver, wherein the controller is configured to transmit, to a terminal, a first radio resource control (RRC) message including first information for performing cell access without random access and second information on cell configuration information, to receive, from the UE, a second RRC message using uplink grant configured in a specific bandwidth part (BWP), and to transmit, to the terminal, a medium access control (MAC) control element (CE) indicating contention resolution by a cell radio network temporary identifier (C-RNTI) indicated in the first message, and wherein the specific BWP is determined by the second information.

Advantageous Effects of Invention

An embodiment disclosed in the disclosure performs access by utilizing predefined UL grant without transmitting a random access preamble for obtaining uplink (UL) grant when attempting to access a target cell, thereby reducing data delay generating during handover.

BRIEF DESCRIPTION OF DRAWINGS

FIG. 1H is a message flow diagram illustrating a use case of a case in which rach-skip includes a release configuration a RACHless HO specific signal structure in NR according to some embodiments of the disclosure.

FIG. 1I is a message flow diagram illustrating a use case of a case in which rach-skip does not include a release configuration in a RACHless HO specific signal structure in NR according to some embodiments of the disclosure.

FIG. 1J is a message flow diagram illustrating a handover case in which normal HO and RACHless HO signals in NR are omitted according to some embodiments of the disclosure.

MODE FOR THE INVENTION

Figure 1A:
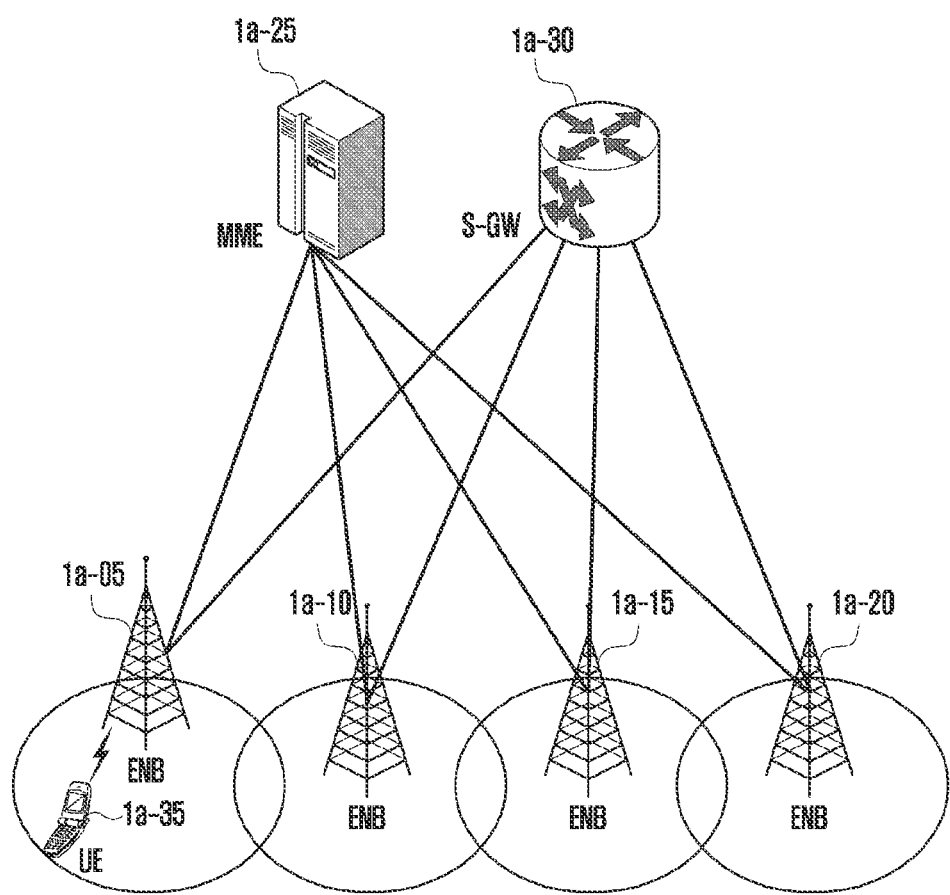
FIG. 1A is a diagram illustrating a structure of an LTE system according to some embodiments of the disclosure.

Hereinafter, the operating principle of the disclosure will be described in detail with reference to the accompanying drawings.

In the following description of the disclosure, when it is determined that a detailed description of a known function or configuration related to the disclosure may unnecessarily obscure the subject matter of the disclosure, the detailed description thereof will be omitted. Further, terms to be described later are terms defined in consideration of functions in the disclosure, which may vary according to intentions or customs of users and operators. Therefore, the definition should be made based on the content throughout this specification. A term for identifying an access node used in the following description, a term for indicating network entities, a term for indicating messages, a term for indicating an interface between network objects, a term for indicating various identification information and the like are exemplified for convenience of description. Accordingly, the disclosure is not limited to the terms described below, and other terms referring to objects having an equivalent technical meaning may be used.

Hereinafter, a base station is a subject performing resource allocation of a UE and may be at least one of a gNode B, an eNode B, a node B, a base station (BS), a radio access unit, a base station controller, or a node on a network. The UE may include a user equipment (UE), a mobile station (MS), a cellular phone, a smart phone, a computer, or a multimedia system capable of performing a communication function. The disclosure is not limited to the above example.

In particular, the disclosure may be applied to 3GPP NR (5th generation mobile communication standard). Further, the disclosure may be applied to intelligent services (e.g., smart home, smart building, smart city, smart car or connected car, healthcare, digital education, retail business, and security and safety-related services) based on 5G communication technology and IoT-related technology. In the disclosure, an eNB may be used interchangeably with a gNB for convenience of description. That is, a base station described as an eNB may represent a gNB. Further, the term UE may refer to mobile phones, NB-IoT devices, sensors, as well as other wireless communication devices.

A wireless communication system is evolving from an initial voice-oriented service to a broadband wireless communication system that provides a high-speed and high-quality packet data service such as communication standards, for example, high speed packet access (HSPA), long term evolution (LTE) or evolved universal terrestrial radio access (E-UTRA), LTE-advanced (LTE-A), LTE-Pro of 3GPP, high rate packet data (HRPD), ultra mobile broadband (UMB) of 3GPP2, and IEEE 802.16e.

As a representative example of a broadband wireless communication system, in an LTE system, an orthogonal frequency division multiplexing (OFDM) method is employed in a downlink (DL), and a single carrier frequency division multiple access (SC-FDMA) method is employed in an uplink (UL). The UL refers to a radio link in which a user equipment (UE) or a mobile station (MS) transmits data or control signals to a base station (BS or eNode B), and the DL refers to a radio link in which the base station transmits data or control signals to the UE. The multiple access method as described above divides data or control information of each user by allocating and operating time-frequency resources to which data or control information is to be transmitted for each user so that they do not overlap each other, that is, orthogonality is established.

As a future communication system after LTE, that is, a 5G communication system should be able to freely reflect various requirements such as users and service providers; thus, services that simultaneously satisfy various requirements should be supported. Services considered for the 5G communication system include enhanced mobile broadband (eMBB), massive machine type communication (mMTC), and ultra reliability low latency communication (URLLC).

According to some embodiments, the eMBB may aim to provide a data transfer rate that is more improved than the data transfer rate supported by the existing LTE, LTE-A, or LTE-Pro. For example, in a 5G communication system, the eMBB should be able to provide a peak data rate of 20 Gbps in the DL and a peak data rate of 10 Gbps in the UL from the viewpoint of one base station. Further, the 5G communication system may have to provide the peak data rate and simultaneously provide an increased user perceived data rate of the UE. In order to satisfy such requirements, the 5G communication system may require improvement of various transmission and reception technologies, including a more advanced multi input multi output (MIMO) transmission technology. Further, an LTE system transmits signals using a transmission bandwidth of maximum 20 MHz in a 2 GHz band currently used by LTE, whereas the 5G communication system uses a frequency bandwidth wider than 20 MHz in a frequency band of 3 to 6 GHz or 6 GHz or more, thereby satisfying a requiring data rate.

At the same time, mMTC is being considered to support application services such as Internet of Things (IoT) in the 5G communication system. In order to efficiently provide Internet of Things, mMTC may require large-scale terminal access support, improved terminal coverage, an improved battery life time, and a reduced terminal cost in a cell. Because Internet of Things is attached to several sensors and various devices to provide communication functions, it should be able to support a large number of terminals (e.g., 1,000,000 terminals/km2) within a cell. Further, because a terminal supporting mMTC is highly likely to be positioned in a shaded area that a cell cannot cover, such as the basement of a building, because of the characteristics of the service, wider coverage may be required compared to other services provided by the 5G communication system. The terminal supporting mMTC should be configured with a low-cost terminal, and because it is difficult to frequently exchange the battery of the UE, a very long battery life time such as 10 to 15 years may be required.

Finally, URLLC is a cellular-based wireless communication service used for mission-critical and may be used for remote control for a robot or machinery, and a service used in industrial automation, an unmanned aerial vehicle, remote health care, emergency alert, and the like. Therefore, communication provided by URLLC may have to provide very low latency (ultra-low latency) and very high reliability (ultra-reliability). For example, a service supporting URLLC should satisfy air interface latency of less than 0.5 milliseconds, and may simultaneously have a requirement of a packet error rate of 10-5 or less. Therefore, for a service that supports URLLC, the 5G system should provide a smaller transmit time interval (TTI) than that of other services, and at the same time, a design that should allocate wide resources in a frequency band so as to secure the reliability of the communication link may be required.

Three services considered in the above-described 5G communication system, i.e., eMBB, URLLC, and mMTC, may be multiplexed and transmitted in one system. In this case, different transmission and reception techniques and transmission and reception parameters may be used between services so as to satisfy different requirements of each service. However, the aforementioned mMTC, URLLC, and eMBB are only examples of different service types, and the service types to which the disclosure is applied are not limited to the above-described examples.

Further, the embodiment of the disclosure will be described below using an LTE, LTE-A, LTE Pro, or 5G (or NR, next-generation mobile communication) system as an example, but the embodiment of the disclosure may be also applied to other communication systems having a similar technical background or channel type. Further, the embodiments of the disclosure may be applied to other communication systems through some modifications within a range that does not significantly depart from the scope of the disclosure as determined by a person having skilled technical knowledge.

FIG. 1A is a diagram illustrating a structure of an LTE system according to some embodiments of the disclosure.

Referring to FIG. 1A, as illustrated, a radio access network of the LTE system may be configured with evolved node Bs (hereinafter, ENB, Node B, or base station) 1a-05, 1a-10, 1a-15, and 1a-20, a mobility management entity (MME) 1a-25, and a serving-gateway (S-GW) 1a-30. A user equipment (hereinafter, UE or terminal) 1a-35 may access an external network through the ENBs 1a-05, 1a-10, 1a-15, and 1a-20 and the S-GW 1a-30.

In FIG. 1A, the ENBs 1a-05, 1a-10, 1a-15, and 1a-20 may correspond to an existing node B of an UMTS system. The ENB may be connected to the UEs 1a-35 through a radio channel and perform a more complex role than that of the existing Node B. In the LTE system, all user traffic including real-time services such as a voice over IP (VoIP) through an Internet protocol may be serviced through a shared channel. Therefore, a device for scheduling by collecting status information such as a buffer status, available transmission power status, and channel status of UEs may be required, and the ENBs 1a-05, 1a-10, 1a-15, and 1a-20 may be in charge this. One ENB may usually control multiple cells. For example, in order to implement a transmission rate of 100 Mbps, the LTE system may use, for example, orthogonal frequency division multiplexing (OFDM) as radio access technology in a 20 MHz bandwidth. Further, the ENB may apply an adaptive modulation & coding (AMC) method that determines a modulation scheme and a channel coding rate according to the channel state of the UE. The S-GW 1a-30 is a device that provides data bearer, and may generate or remove data bearer under the control of the MME 1a-25. The MME is a device in charge of various control functions as well as a mobility management function for the UE, and may be connected to a plurality of base stations.

Figure 1B:
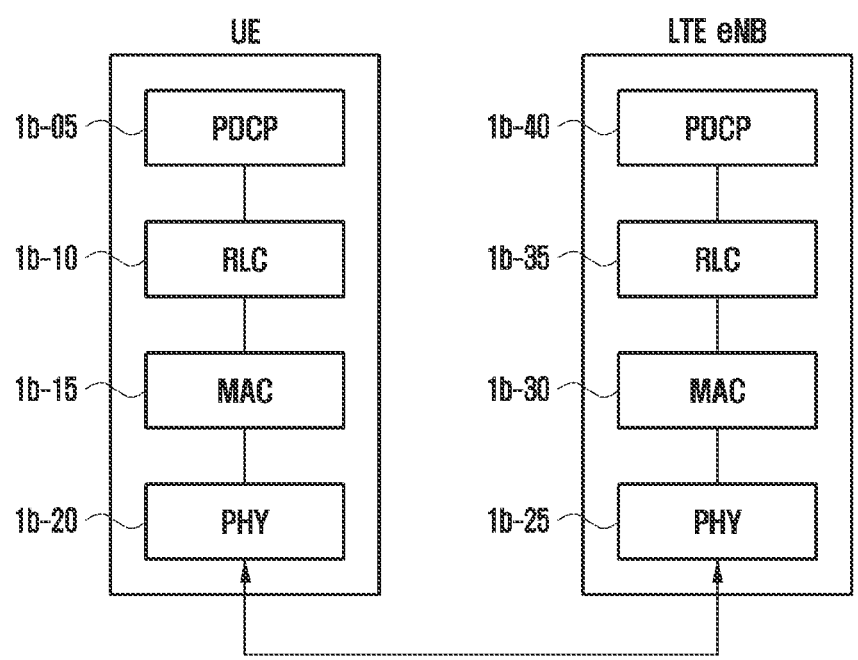
FIG. 1B is a diagram illustrating a radio protocol structure of an LTE system according to some embodiments of the disclosure.

FIG. 1B is a diagram illustrating a radio protocol structure of an LTE system according to some embodiments of the disclosure.

Referring to FIG. 1B, the radio protocol of the LTE system may include packet data convergence protocols (PDCP) 1b-05 and 1b-40, radio link controls (RLC) 1b-10 and 1b-35, and medium access controls (MAC) 1b-15 and 1b-30 in the terminal and the ENB, respectively. The PDCP may be in charge of operations such as IP header compression/restoration. Main functions of the PDCP may be summarized as follows. The main functions of the PDCP are not limited to the following examples.

Header compression and decompression: ROHC only
Transfer of user data
In-sequence delivery of upper layer PDUs at PDCP re-establishment procedure for RLC AM
For split bearers in DC (only support for RLC AM): PDCP PDU routing for transmission and PDCP PDU reordering for reception
Duplicate detection of lower layer SDUs at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

According to some embodiments, the radio link controls (RLC) 1b-10 and 1b-35 may reconfigure a PDCP packet data unit (PDU) to an appropriate size to perform an ARQ operation and the like. Main functions of the RLC may be summarized as follows. The main functions of the RLC are not limited to the following examples.

Transfer of upper layer PDUs
Error Correction through ARQ (only for AM data transfer)
Concatenation, segmentation and reassembly of RLC SDUs (only for UM and AM data transfer)
Re-segmentation of RLC data PDUs (only for AM data transfer)
Reordering of RLC data PDUs (only for UM and AM data transfer)
Duplicate detection (only for UM and AM data transfer)
Protocol error detection (only for AM data transfer)
RLC SDU discard (only for UM and AM data transfer)
RLC re-establishment According to some embodiments, the MACs 1b-15 and 1b-30 may be connected to several RLC layer devices configured in one terminal, and perform an operation of multiplexing RLC PDUs to MAC PDUs and demultiplexing the RLC PDUs from the MAC PDUs. Main functions of the MAC may be summarized as follows.

The main functions of the MAC are not limited to the following examples.

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
MBMS service identification
Transport format selection
Padding According to some embodiments, physical layers 1b-20 and 1b-25 may perform an operation of channel-coding and modulating upper layer data, making the upper layer data into an OFDM symbol and transmitting the OFDM symbol using a wireless channel, or demodulating an OFDM symbol received through the wireless channel, channel-decoding the OFDM symbol, and transferring the OFDM symbol to a higher layer. The disclosure is not limited to the following examples.

Figure 1C:
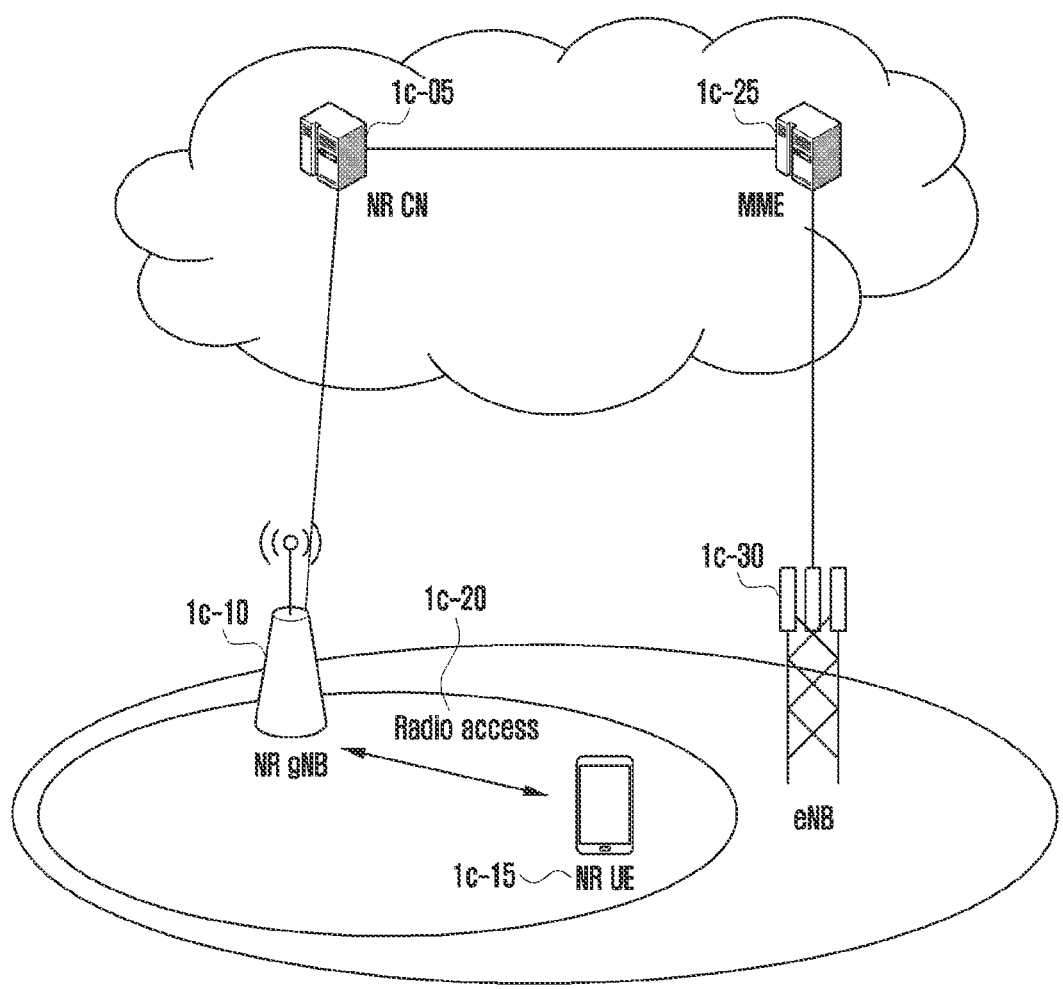
FIG. 1C is a diagram illustrating a structure of a next-generation mobile communication system according to some embodiments of the disclosure.

FIG. 1C is a diagram illustrating a structure of a next-generation mobile communication system according to some embodiments of the disclosure.

Referring to FIG. 1C, a radio access network of the next-generation mobile communication system (hereinafter, NR or 5g) may be configured with a new radio node B (hereinafter, NR gNB or NR base station) 1c-10 and a new radio core network (NR CN) 1c-15. The new radio user equipment (NR UE or terminal) 1c-15 may access an external network through the NR gNB 1c-10 and the NR CN 1c-05.

In FIG. 1C, the NR gNB 1c-10 may correspond to an evolved node B (eNB) of the existing LTE system. The NR gNB may be connected to the NR UE 1c-15 through a radio channel and provide a service superior to that of the existing Node B. In the next-generation mobile communication system, all user traffic may be serviced through a shared channel. Accordingly, a device for scheduling by collecting status information such as a buffer status, an available transmission power status, and a channel status of UEs may be required, and the NR gNB 1c-10 may be in charge of this. One NR gNB may control multiple cells. In a next-generation mobile communication system, a bandwidth greater than or equal to the current maximum bandwidth may be applied to implement ultrahigh speed data transmission compared to current LTE. Further, an orthogonal frequency division multiplexing (OFDM) technique may be used as radio access technique and additionally use beamforming technique.

Further, according to some embodiments, the NR gNB may apply adaptive modulation & coding (hereinafter, referred to as AMC) scheme that determines a modulation scheme and a channel coding rate according to the channel state of the terminal. The NR CN 1c-05 may perform functions such as mobility support, bearer configuration, QoS configuration, and the like. The NR CN 1c-05 is a device in charge of various control functions as well as a mobility management function for the terminal, and may be connected to a plurality of base stations. Further, the next-generation mobile communication system may be linked with the existing LTE system, and the NR CN may be connected to an MME 1c-25 through a network interface. The MME may be connected to an eNB 1c-30, which is the existing base station.

Figure 1D:
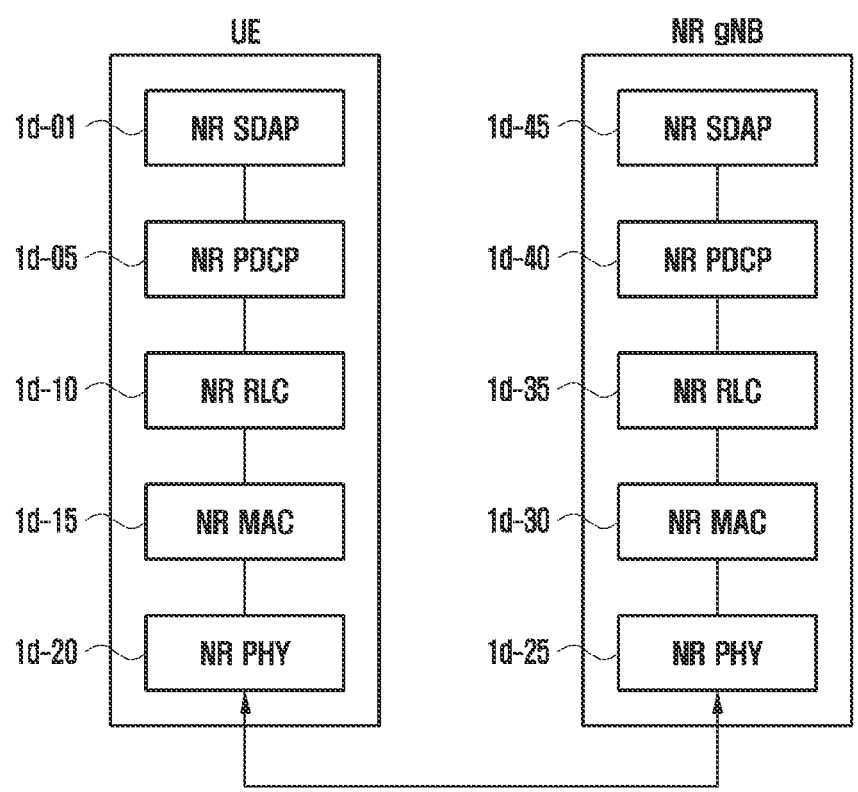
FIG. 1D is a diagram illustrating a radio protocol structure of a next-generation mobile communication system according to some embodiments of the disclosure.

FIG. 1D is a diagram illustrating a radio protocol structure of a next-generation mobile communication system according to some embodiments of the disclosure.

Referring to FIG. 1D, the radio protocols of the next-generation mobile communication system may include NR service data adaptation protocols (SDAP) 1d-01 and 1d-45, NR PDCPs 1d-05 and 1d-40, NR RLCs 1d-10 and 1d-35, and NR MACs 1d-15 and 1d-30 in the terminal and the NR base station, respectively.

According to some embodiments, main functions of the NR SDAPs 1d-01 and 1d-45 may include some of the following functions. However, the main functions of the NR SDAPs 1d-01 and 1d-45 are not limited to the following examples.

transfer of user plane data
    mapping between a QoS flow and a DRB for both DL and UL
    marking QoS flow ID in both DL and UL packets
    reflective QoS flow to DRB mapping for the UL SDAP PDUs.

For an SDAP layer device, the terminal may receive a configuration on whether to use the header of the SDAP layer device for each PDCP layer device, for each bearer, or for each logical channel, or whether to use a function of the SDAP layer device with a radio resource control (RRC) message. Further, in the SDAP layer device, when an SDAP header is set, the UE may instruct to update or reconfigure mapping information for uplink and downlink QoS flows and data bearers with a non-access stratum (NAS) quality of service (QoS) reflective 1-bit indicator (NAS reflective QoS) of the SDAP header, and an access stratum (AS) QoS reflective 1-bit indicator (AS reflective QoS). According to some embodiments, the SDAP header may include QoS flow ID information indicating a QoS. According to some implementations, QoS information may be used as a data processing priority, scheduling information, and the like for supporting a smooth service.

According to some embodiments, main functions of the NR PDCPs 1d-05 and 1d-40 may include some of the following functions. However, the main functions of the NR PDCPs 1d-05 and 1d-40 are not limited to the following examples.

Header compression and decompression: ROHC only
    Transfer of user data
    In-sequence delivery of upper layer PDUs
    Out-of-sequence delivery of upper layer PDUs
    PDCP PDU reordering for reception
    Duplicate detection of lower layer SDUs
    Retransmission of PDCP SDUs
    Ciphering and deciphering
    Timer-based SDU discard in uplink.

In the above description, reordering of the NR PDCP device may mean a function of reordering PDCP PDUs received from a lower layer in order based on a PDCP sequence number (SN). Reordering of the NR PDCP device may include a function of delivering data to a higher layer in the reordered order, or may include a function of directly delivering data without considering the order, a function of recording lost PDCP PDUs by reordering the order, a function of reporting a status on the lost PDCP PDUs to the transmitting side, and a function of requesting retransmission of the lost PDCP PDUs.

According to some embodiments, main functions of the NR RLCs 1d-10 and 1d-35 may include some of the following functions. However, the main functions of the NR RLCs 1d-10 and 1d-35 are not limited to the following examples.

Transfer of upper layer PDUs
    In-sequence delivery of upper layer PDUs
    Out-of-sequence delivery of upper layer PDUs
    Error Correction through ARQ
    Concatenation, segmentation and reassembly of RLC SDUs
    Re-segmentation of RLC data PDUs
    Reordering of RLC data PDUs
    Duplicate detection
    Protocol error detection
    RLC SDU discard
    RLC re-establishment In the above description, in-sequence delivery of the NR RLC device may mean a function of delivering RLC SDUs received from a lower layer in order to a higher layer. When one RLC SDU is originally divided into several RLC SDUs and received, in-sequence delivery of the NR RLC device may include a function of reassembling and delivering several RLC SDUs.

In-sequence delivery of the NR RLC device may include a function of reordering the received RLC PDUs based on an RLC sequence number (SN) or a PDCP sequence number (SN), and may include a function of recording the lost RLC PDUs by reordering the order, a function of reporting a status on the lost RLC PDUs to the transmitting side, and a function of requesting retransmission of the lost RLC PDUs.

In-sequence delivery of the NR RLC device may include a function of delivering only RLC SDUs before the lost RLC SDU in order to a higher layer when there is a lost RLC SDU.

In-sequence delivery of the NR RLC device may include a function of delivering all RLC SDUs received before the timer starts in order to a higher layer, if a predetermined timer expires, even if there is a lost RLC SDU.

In-sequence delivery of the NR RLC device may include a function of delivering all RLC SDUs received up to now in order to a higher layer, if a predetermined timer expires, even if there is a lost RLC SDU.

The NR RLC device may process RLC PDUs in the order in which the RLC PDUs are received and deliver the RLC PDUs to the NR PDCP device regardless of the order of the sequence number (Out-of sequence delivery).

When the NR RLC device receives a segment, the NR RLC device may receive segments stored in the buffer or to be received later, reconfigure the segments into one complete RLC PDU, and then deliver the one complete RLC PDU to the NR PDCP device.

The NR RLC layer may not include a concatenation function, and may perform a concatenation function in the NR MAC layer or may replace a concatenation function with a multiplexing function of the NR MAC layer.

In the above description, out-of-sequence delivery of the NR RLC device may mean a function of directly delivering RLC SDUs received from a lower layer to a higher layer regardless of order. Out-of-sequence delivery of the NR RLC device may include a function of reassembling and delivering several RLC SDUs when one RLC SDU is originally divided into several RLC SDUs and received. Out-of-sequence delivery of the NR RLC device may include a function of storing the RLC SN or PDCP SN of the received RLC PDUs, ordering the order thereof, and recording lost RLC PDUs.

According to some embodiments, the NR MACs 1d-15 and 1d-30 may be connected to several NR RLC layer devices configured in one terminal, and main functions of the NR MAC may include some of the following functions. However, the main functions of the NR MAC are not limited to the following examples.

Mapping between logical channels and transport channels
    Multiplexing/demultiplexing of MAC SDUs
    Scheduling information reporting
    Error correction through HARQ
    Priority handling between logical channels of one UE
    Priority handling between UEs by means of dynamic scheduling
    MBMS service identification
    Transport format selection
    Padding The NR PHY layers 1d-20 and 1d-25 may perform an operation of channel-coding and modulating upper layer data, making the upper layer data into an OFDM symbol, and transmitting the OFDM symbol to the radio channel, or demodulating and channel-decoding the OFDM symbol received through the radio channel to deliver the OFDM symbol to the upper layer.

Figure 1E:
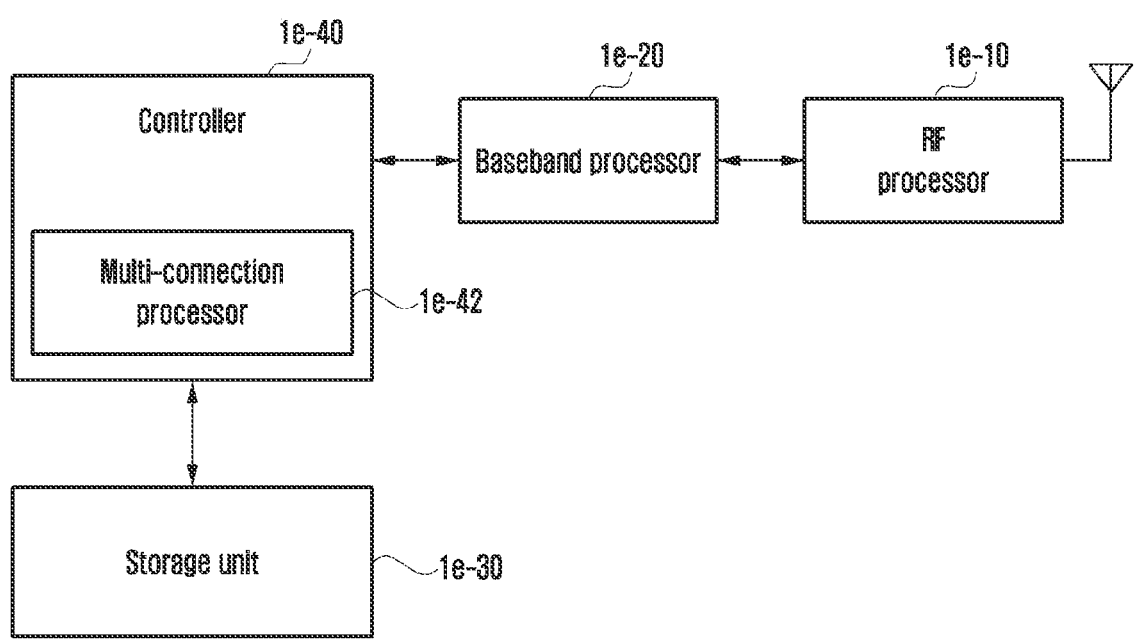
FIG. 1E is a block diagram illustrating an internal structure of a UE according to some embodiments of the disclosure.

FIG. 1E is a block diagram illustrating an internal structure of a terminal to which the disclosure is applied.

Referring to FIG. 1E, the terminal may include a radio frequency (RF) processor 1e-10, a baseband processor 1e-20, a storage unit 1e-30, and a controller 1e-40. The disclosure is not limited to the above example, and the terminal may include fewer or more configurations than the configuration illustrated in FIG. 1E.

The RF processor 1e-10 may perform a function for transmitting and receiving a signal through a wireless channel, such as band conversion and amplification of the signal. That is, the RF processor 1e-10 may up-convert a baseband signal provided from the baseband processor 1e-20 into an RF band signal, transmit the RF band signal through the antenna, and down-convert the RF band signal received through the antenna to the baseband signal. For example, the RF processor 1e-10 may include a transmission filter, a reception filter, an amplifier, a mixer, an oscillator, a digital to analog convertor (DAC), an analog to digital convertor (ADC), and the like. The disclosure is not limited to the above example. Although only one antenna is illustrated in FIG. 1E, the terminal may include a plurality of antennas. Further, the RF processor 1e-10 may include a plurality of RF chains. Further, the RF processor 1e-10 may perform beamforming. For beamforming, the RF processor 1e-10 may adjust a phase and magnitude of each of signals transmitted and received through a plurality of antennas or antenna elements. Further, the RF processor 1e-10 may perform multi input multi output (MIMO), and receive several layers when performing the MIMO operation.

The baseband processor 1e-20 performs a function of converting between a baseband signal and a bit string according to the physical layer standard of the system. For example, when transmitting data, the baseband processor 1e-20 may encode and modulate the transmitted bit string to generate complex symbols. Further, when receiving data, the baseband processor 1e-20 may restore the received bit string by demodulating and decoding the baseband signal provided from the RF processor 1e-10. For example, in case of orthogonal frequency division multiplexing (OFDM) scheme, when transmitting data, the baseband processor 1e-20 encodes and modulates a transmission bit string to generate complex symbols, maps the complex symbols to subcarriers, and then configures OFDM symbols through inverse fast Fourier transform (IFFT) operation and cyclic prefix (CP) insertion. Further, when receiving data, the baseband processor 1e-20 may divide the baseband signal provided from the RF processor 1e-10 into OFDM symbol units, restore a signal mapped to subcarriers through fast Fourier transform (FFT), and then restore the received bit string through demodulation and decoding.

The baseband processor 1e-20 and the RF processor 1e-10 transmit and receive signals, as described above. The baseband processor 1e-20 and the RF processor 1e-10 may be referred to as a transmitter, a receiver, a transceiver, or a communication unit. Furthermore, at least one of the baseband processor 1e-20 and the RF processor 1e-10 may include a plurality of communication modules so as to support a plurality of different wireless access technologies. Further, at least one of the baseband processor 1e-20 and the RF processor 1e-10 may include different communication modules so as to process signals of different frequency bands. For example, different wireless access technologies may include a wireless LAN (e.g., IEEE 802.11), a cellular network (e.g., LTE), and the like. Further, the different frequency bands may include a super high frequency (SHF) (e.g., 2.NRHz, NRhz) band and a millimeter wave (e.g., 60 GHz) band. The terminal may transmit and receive a signal to and from the base station using the baseband processor 1e-20 and the RF processor 1e-10, and the signal may include control information and data.

The storage unit 1e-30 stores data such as a basic program, an application program, and configuration information for the operation of the UE. In particular, the storage unit 1e-30 may store information related to a second access node that performs wireless communication using second wireless access technology. The storage unit 1e-30 provides the stored data according to the request of the controller 1e-40. The storage unit 1e-30 may be configured with a storage medium such as a read-only memory (ROM), a random access memory (RAM), a hard disk, a compact disk read-only memory (CD-ROM), and a digital versatile disc (DVD), or a combination of storage media. Further, the storage unit 1e-30 may include a plurality of memories.

The controller 1e-40 controls overall operations of the terminal. For example, the controller 1e-40 transmits and receives signals through the baseband processor 1e-20 and the RF processor 1e-10. Further, the controller 1e-40 writes and reads data in the storage unit 1e-40. To this end, the controller 1e-40 may include at least one processor. For example, the controller 1e-40 may include a communication processor (CP) that controls for communication and an application processor (AP) that controls an upper layer such as an application program. Further, at least one component in the terminal may be implemented into one chip.

Figure 1F:
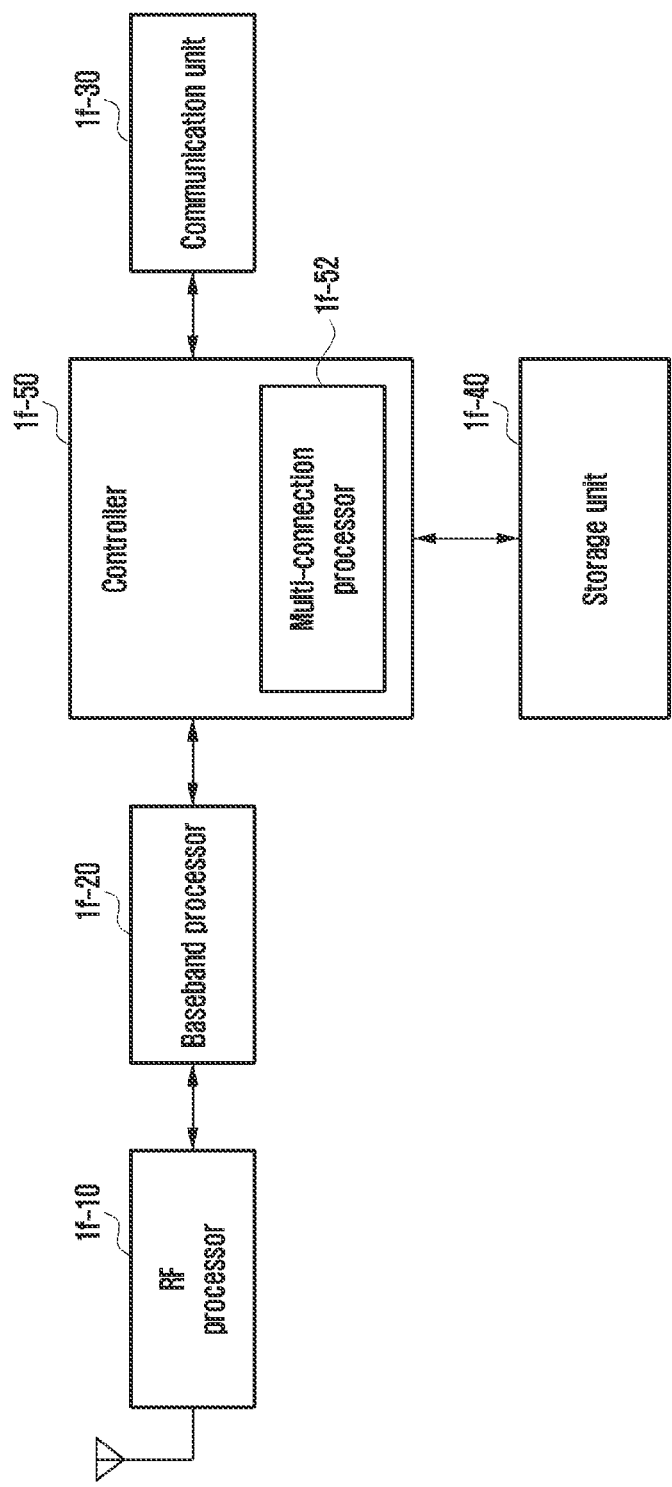
FIG. 1F is a block diagram illustrating a configuration of an NR base station according to some embodiments of the disclosure.

FIG. 1F is a block diagram illustrating a configuration of an NR base station according to some embodiments of the disclosure.

Referring to FIG. 1F, the base station may include an RF processor 1f-10, a baseband processor 1f-20, a backhaul communication unit 1f-30, a storage unit 1f-40, and a controller 1f-50. The disclosure is not limited to the example, and the base station may include fewer or more configurations than those illustrated in FIG. 1F.

The RF processor 1f-10 may perform a function for transmitting and receiving a signal through a wireless channel, such as band conversion and amplification of the signal. That is, the RF processor 1f-10 up-converts a baseband signal provided from the baseband processor 1f-20 into an RF band signal, transmits the RF band signal through the antenna, and down-converts the RF band signal received through the antenna to the baseband signal. For example, the RF processor 1f-10 may include a transmission filter, a reception filter, an amplifier, a mixer, an oscillator, a digital to analog converter (DAC), an analog to digital converter (ADC), and the like. Although only one antenna is illustrated in FIG. 1F, the RF processor 1f-10 may include a plurality of antennas. Further, the RF processor 1f-10 may include a plurality of RF chains. Further, the RF processor 1f-10 may perform beamforming. For beamforming, the RF processor 1f-10 may adjust a phase and magnitude of each of signals transmitted and received through a plurality of antennas or antenna elements. The RF processor may transmit one or more layers to perform a downlink MIMO operation.

The baseband processor 1f-20 may perform a function of converting between a baseband signal and a bit string according to the physical layer standard of first radio access technology. For example, when transmitting data, the baseband processor 1f-20 may encode and modulate the transmitted bit string to generate complex symbols. Further, when receiving data, the baseband processor 1f-20 may restore the received bit string by demodulating and decoding the baseband signal provided from the RF processor 1f-10. For example, in the OFDM scheme, when transmitting data, the baseband processor 1f-20 encodes and modulates the transmission bit string to generate complex symbols, maps the complex symbols to subcarriers, and configures OFDM symbols through IFFT operation and CP insertion. Further, when receiving data, the baseband processor 1f-20 may divide the baseband signal provided from the RF processor 1f-10 into OFDM symbol units, restore signals mapped to the subcarriers through FFT operation, and then restore the received bit string through demodulation and decoding. The baseband processor 1f-20 and the RF processor 1f-10 may transmit and receive signals, as described above. Accordingly, the baseband processor 1f-20 and the RF processor 1f-10 may be referred to as a transmitter, a receiver, a transceiver, a communication unit, or a RF unit. The base station may transmit and receive signals to and from the terminal using the baseband processor 1f-20 and the RF processor 1f-10, and the signals may include control information and data.

The backhaul communication unit 1f-30 provides an interface for communicating with other nodes in the network. That is, the backhaul communication unit 1f-30 may convert a bit string transmitted from a main station to another node, for example, an auxiliary base station, and a core network into a physical signal, and convert a physical signal received from another node into a bit string. The backhaul communication unit 1f-30 may be included in the communication unit.

The storage unit 1f-40 stores data such as a basic program, an application program, and configuring information for an operation of the base station. The storage unit 1f-40 may store information on bearer allocated to an accessed terminal, a measurement result reported from the accessed terminal, and the like. Further, the storage unit 1f-40 may store information to be a criterion for determining whether to provide or stop multiple connections to the terminal. The storage unit 1f-40 provides the stored data according to the request of the controller 1f-50. The storage unit 1f-40 may be configured with a storage medium such as a ROM, a RAM, a hard disk, a CD-ROM, and a DVD, or a combination of storage media. Further, the storage unit 1f-40 may include a plurality of memories. According to some embodiments, the storage unit 1f-40 may store a program for performing the buffer status reporting method according to the disclosure.

The controller 1f-50 controls overall operations of the base station. For example, the controller 1f-50 transmits and receives signals through the baseband processor 1f-20 and the RF processor 1f-10 or through the backhaul communication unit 1f-30. Further, the controller 1f-50 writes and reads data in the storage unit 1f-40. To this end, the controller 1f-50 may include at least one processor. Further, at least one configuration of the base station may be implemented with one chip.

Figure 1G:
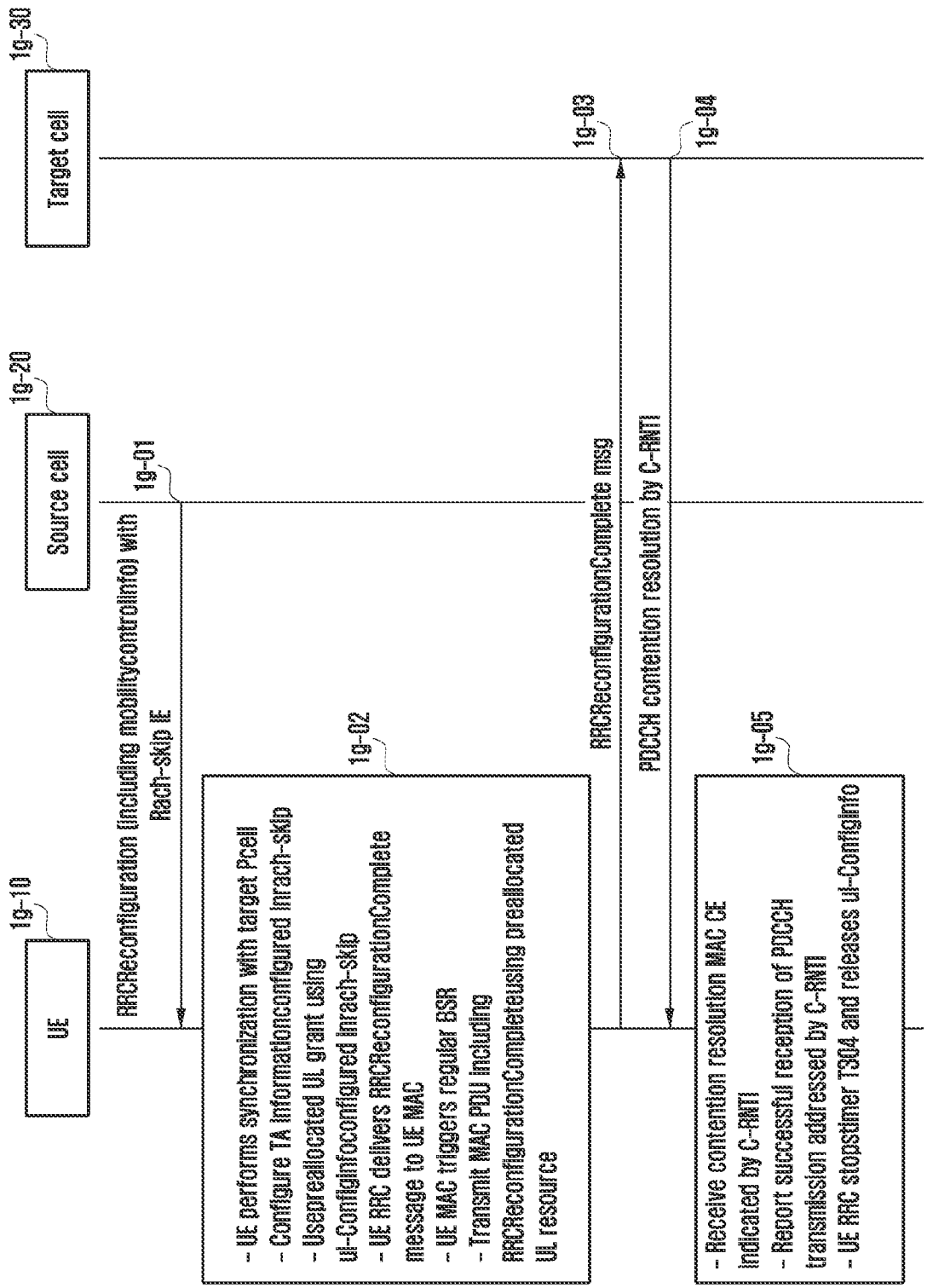
FIG. 1G illustrates a RACHless handover operation in legacy LTE.
Figure 11:
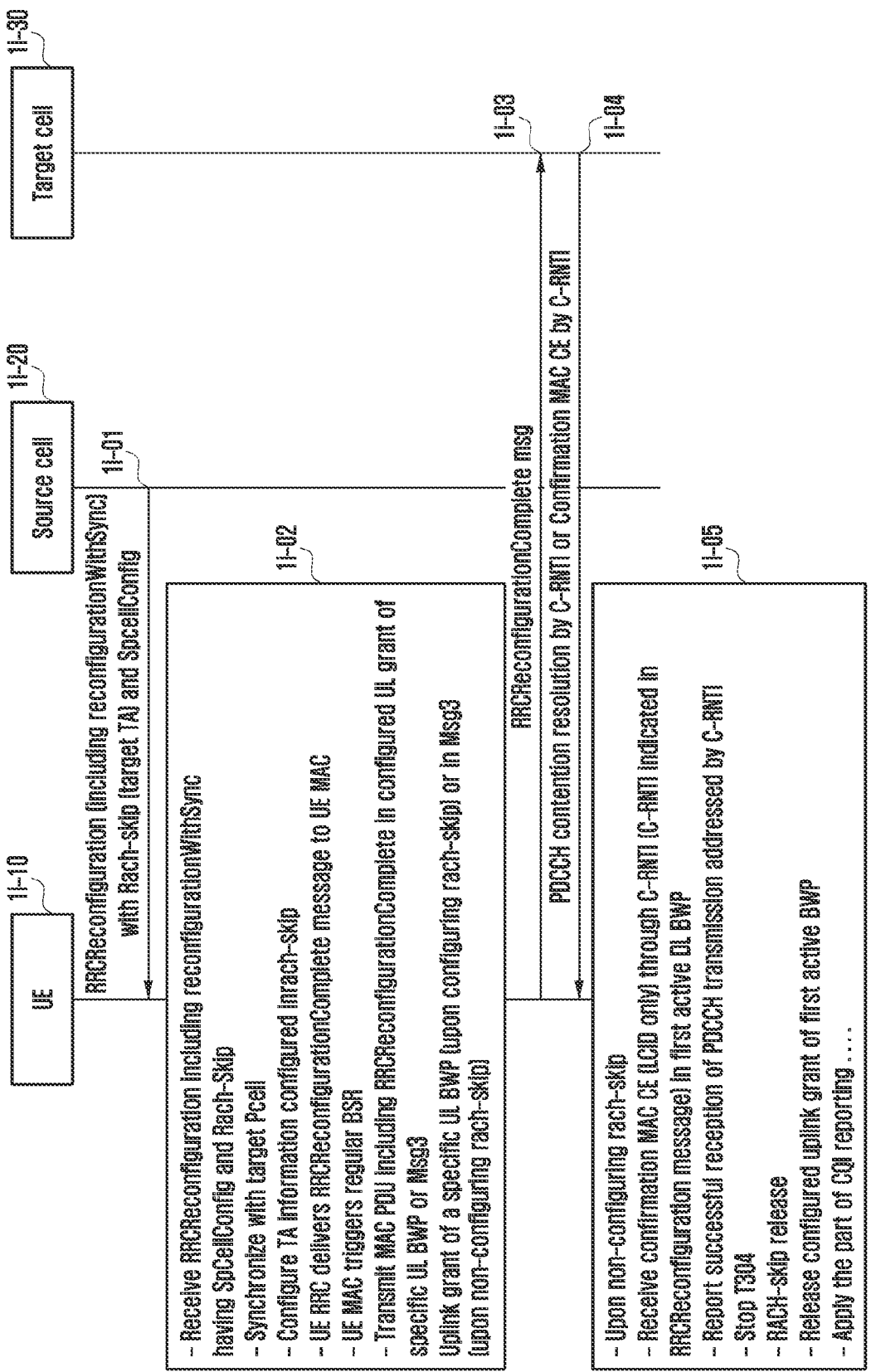

FIG. 1G illustrates a RACHless handover operation in legacy LTE.

A UE 1g-10 receives an RRC reconfiguration message including mobilitycontroinfo from a base station 1g-20 (step 1g-01). The message may include a rach-skip IE. The rach-skip IE (Information Element) may include TA information to be used in a target cell 1g-30 and preallocated UL grant information. The UE 1g-10, having received the message may perform the following operation (step 1g-02).

The UE 1g-10 may perform synchronization with the target PCell.

The UE 1g-10 may configure a TA value with TA information configured in the received RRC reconfiguration message.

The UE 1g-10 may use preallocated UL grant using ul-ConfigInfo configured in rach-skip.

The UE RRC may transmit an RRCReconfigurationcComplete message to the UE MAC.

The UE MAC may trigger a regular BSR.

By applying preallocated UL grant using ul-ConfigInfo configured in rach-skip to the target cell, the terminal 1g-10 may transmit the MAC PDU including the RRCReconfigurationComplete delivered in this way (step 1g-03).

The UE MAC may receive a contention resolution MAC CE indicated by a C-RNTI. Accordingly, the UE MAC may report successful reception of PDCCH transmission addressed by the C-RNTI (step 1g-04).

The UE RRC may stop a timer T304 and release ul-ConfigInfo (step 1g-05).

FIG. 1H is a diagram illustrating a use case of a case that rach-skip includes a configuredUplinkGrantrelease configuration in a RACHless HO specific signal structure in NR according to some embodiments of the disclosure.

A base station 1h-20 may transmit an RRCReconfiguration message including reconfigurationWithSync to a terminal 1h-10 (step 1h-01). In this case, the message may include the following information.

The message may include Rach-Skip IE and SpCellConfig IE.

The Rach-Skip IE includes a target TA field, and the field may designate a TA value used in the target cell. The field may indicate one of three of TA-0, PTAG, or STAG id.

Further, the Rach-skip IE may include a configuredUplinkGrantRelease field, and the field may include a value for determining whether to release configured uplink grant used after performing rach less HO success. The field may have a data type of boolean (yes or no) or Enumerate{TRUE}.

The SpCellConfig field includes the N number of BWP configuration information and also includes firstActiveBWP id information. The BWP configuration information may include ConfiguredGrantConfig information.

When the terminal 1h-10 receives the message (step 1h-01) from the base station 1h-20, the terminal 1h-10 may sequentially perform the following operations (step 1h-02).

The UE 1h-10 may synchronize with the target PCell.

Further, according to a value in the target TA field, an N_{ta} value used in the target Pcell may be applied as follows. If the field value is TA-0, N_{TA}=0, and if the target TA field value is PTAG, and if the SpCellConfig received in step 1h-01 is included in the MasterCellGroup information, NTA of the PTAG of the MCG is applied, and if the SpCellConfig is included in SecondaryCellGroup information, NTA of PTAG of SCG may be applied. Further, if the Target TA value is STAG id, and if the SpCellConfig received in step 1h-01 is included in the MasterCellGroup information, NTA of the STAG specified by the STAG id is applied, and if SpCellConfig is included in the SecondaryCellGroup information, NTA of the STAG specified by the STAG id may be applied.

Thereafter, the RRC of the terminal may transmit the RRCReconfigurationcComplete RRC PDU to the UE MAC.

Thereafter, the UE MAC may trigger a regular BSR. Further, the terminal 1h-10 may transmit the MAC PDU including the RRCReconfigurationComplete message to a specific UL BWP using configured uplink grant (step 1h-03). In this case, the specific UL BWP may be a BWP specified by the first active BWP id.

Thereafter, the UE 1h-10 may receive a confirmation MAC CE (may include only a separate LCID) or a contention resolution MAC CE in the First active DL BWP through the C-RNTI (C-RNTI indicated in the RRCReconfiguration message including reconfigurationWithSync received in step 1h-01)(step 1h-04). Here, the confirmation MAC CE is a MAC CE separate from the contention resolution MAC CE and has a separate LCID. When the terminal receives the MAC CE, the terminal may perform the following operation (step 1h-05).

The MAC of the UE, having received the MAC CE may report to the RRC that PDCCH transmission addressed by the C-RNTI has successfully received.

Further, the RRC of the terminal stops a T304 timer. Further, when ConfiguredUplinkGrantRelease is configured to mean release in rach-skip IE included in the RRCReconfiguration message including reconfigurationWithSync received in step 1h-01, for example, when it has a boolean data type, it is configured to yes or true, or when ConfiguredUplinkGrantRelease has an Enumerate{true} data type, if ConfiguredUplinkGrantRelease itself has been set, it is possible to release configured uplink grant of the specific BWP. In this case, the specific BWP may be a BWP specified by the first active BWP id.

Information included in ConfiguredGrantConfig in configuration information for each BWP included in SpcellConfig included in the RRCReconfiguration message including reconfigurationWithSync received by the UE 1h-10 in step 1h-01 may have the following values.

nrofHARQ-Processes: the number of configured HARQs,
periodicity: a period that can be transmitted through the configured grant UL;
timeDomainOffset: offset value based on SFN=0,
timeDomainAllocation: display a start symbol, length, and PUSCH mapping type,
frequencyDomainAllocation: frequency domain allocation information,
mcsAndTBS: mcs and TBS value information used for the configured UL grant Further, valid time information of configured UL grant to be used for the purpose of rach-skip HO for a specific time may be additionally included. For example, a valid time may be included in absolute time units, and in this case, the information may be included in the rach-skip IE. Alternatively, valid time information may be expressed in the ConfiguredGrantConfig configuration information of a specific BWP in units of maximum valid possible periodicity. When expressed in absolute time units, the UE starts the timer from the moment that the terminal receives the message received in step 1i-01, and when the timer expires, it is regarded as a HO failure. Further, when the HO is successful and the contention resolution MAC CE is successfully received, the terminal may stop the timer. In the case of setting the maximum valid possible periodicity unit of a specific BWP, when the UE starts counting after synchronization with the corresponding target PCell and does not receive a contention resolution MAC CE from the target PCell while passing the corresponding periodicity, it may be regarded as HO failure.

FIG. 1I is a diagram illustrating a use case of a case in which rach-skip does not include a ConfiguredUplinkGrant-release configuration in a RACHless HO specific signal structure in NR according to some embodiments of the disclosure.

A base station 1i-20 may transmit an RRCReconfiguration message including reconfigurationWithSync to a terminal 1i-10 (step 1i-01). In this case, the message may include the following information.

The message may include Rach-Skip IE and SpCellConfig 1E.
The Rach-Skip IE may include a target timing advance (TA) field, and the field may designate a TA value used in the target cell. The field may indicate one of three of TA-0, PTAG, or STAG id.
The SpCellConfig field includes the N number of BWP configuration information and also includes firstActiveBWP id information. The BWP configuration information may include ConfiguredGrantConfig information.

When the UE 1i-10 receives the message from the base station 1i-20 (step 1i-01), the terminal 1i-10 may perform the following operation (step 1i-02).

The UE 1i-10 may synchronize with the target PCell.

Further, according to a value in the target TA field, an $N_{ta}$ value used in the target Pcell is applied as follows. When the field value is TA-0, $N_{TA}=0$, and when the target TA field value is PTAG, if the SpCellConfig received in step 1i-01 is included in MasterCellGroup information, NTA of the PTAG of the MCG is applied, and if the SpCellConfig is included in SecondaryCellGroup information, NTA of the PTAG of the SCG may be applied. Further, when the Target TA value is STAG id, if the SpCellConfig received in step 1i-01 is included in the MasterCellGroup information, NTA of the STAG specified by the STAG id may be applied, and if the SpCellConfig is included in the SecondaryCellGroup information, NTA of the STAG specified by the STAG id may be applied.

Thereafter, the RRC of the terminal may transmit the RRCReconfigurationcComplete RRC PDU to the UE MAC. Thereafter, the MAC of the terminal may trigger a regular BSR. Further, the UE 1i-10 may transmit a MAC PDU including the RRCReconfigurationComplete message using the configured uplink grant of a specific UL BWP (step 1i-03). In this case, the UE 1i-10 may transmit a MAC PDU through the configured uplink grant of the BWP specified by the first active BWP id.

After this transmission, the UE 1i-10 may receive a confirmation MAC CE (may include only a separate LCID) or a contention resolution MAC CE in the First active DL BWP through the C-RNTI (C-RNTI indicated in the RRCReconfiguration message including reconfigurationWithSync received in the first step) (step 1i-04). Here, the confirmation MAC CE is a MAC CE separate from the contention resolution MAC CE and has a separate LCID. When the terminal receives the MAC CE (step 1i-04), the terminal may perform the following operation (step 1i-05).

The UE may first stop T304. Further, the MAC of the terminal, having received the MAC CE may report to the RRC that PDCCH transmission addressed to the C-RNTI has successfully received. Further, the MAC of the UE may release a RACH-skip configuration, and release configured uplink grant of the first active BWP. Thereafter, parts of a CQI reporting configuration, scheduling request configuration, and sounding RS configuration that can be configured even if the UE does not know relative system frame number (SFN) information of the target sPcell are applied. When SFN information of the target spcell is obtained later, measurement and radio resource configuration parts may be applied.

Information included in ConfiguredGrantConfig in the configuration information for each BWP included in Spcell-Config included in the RRCReconfiguration message including reconfigurationWithSync received by the terminal in step 1i-01 may have the following values.

nrofHARQ-Processes: the number of configured HARQs,
periodicity: a period that can be transmitted through the configured grant UL;
timeDomainOffset: offset value based on SFN=0,
timeDomainAllocation: display a start symbol, length, and PUSCH mapping type,
frequencyDomainAllocation: frequency domain allocation information,
mcsAndTBS: mcs and TBS value information used for the configured UL grant Further, valid time information of the configured UL grant to be used for the purpose of rach-skip HO for a specific time may be additionally included. For example, the valid time may be included in absolute time units, and in this case, the information may be included in the rach-skip IE. Alternatively, the valid time information may be expressed in ConfiguredGrantConfig configuration information of a specific BWP in units of maximum valid possible periodicy. When expressed in absolute time units, the terminal starts the timer from the moment that the terminal receives the message received in step 1i-01, and when the timer expires, it is regarded as a HO failure. Further, when the HO is successful and a contention resolution MAC CE or a confirmation MAC CE is successfully received, the terminal may stop the timer. In the case where the maximum valid possible periodicity unit of a specific BWP is set, the terminal starts counting after synchronization with the corresponding target Pcell, and when the terminal does not receive a contention resolution MAC CE from the target PCell while passing the corresponding periodicity, it is regarded as HO failure.

FIG. 1J is a diagram illustrating a handover case when a RACHless HO signal is omitted from an RRCRconfiguration message including reconfigurationWithSync in NR according to some embodiments of the disclosure.

In this embodiment, in the case of FIGS. 1H and 1G, rach-skip is optional and includes a case where the configuration is omitted.

A base station 1j-20 may transmit an RRCReconfiguration including reconfigurationWithSync to a terminal 1j-10 (step 1j-01). When a rach-skip IE does not exist, the terminal 1j-10, having received the message may perform the following operation (step 1j-02).

The UE 1j-10 may perform synchronization with the target PCell. Further, the terminal 1j-10 may transmit a random access preamble configured in RRCReconfiguration including the reconfigurationWithSync to a RACH resource of the target cell.

The RRC of the terminal may deliver an RRCReconfigurationComplete message to the MAC of the UE. The MAC of the terminal may transmit a MAC PDU including the RRCReconfigurationComplete to Msg3 (step 1j-03). In this case, transmission may be performed using the UL grant indicated by the RAR. In this case, when the preamble delivered during RA is a common preamble, a contention resolution MAC CE may be received through TC-RNTI (C-RNTI indicated in RAR) in firstactive DL BWP (step 1j-04). Thereafter, T304 may be stopped (step 1j-05). Further, parts of a CQI reporting configuration, scheduling request configuration, and sounding RS configuration that can be configured even when the UE does not know relative SFN information of the target sPcell are applied. When SFN information of the target spcell is obtained later, measurement and radio resource configuration parts may be applied.

Information included in ConfiguredGrantConfig in the configuration information for each BWP included in a SpcellConfig included in the RRCReconfiguration message including reconfigurationWithSync received by the UE in step 1j-01 may have the following values.

nrofHARQ-Processes: the number of configured HARQs,
periodicity: a period that can be transmitted through the configured grant UL,
timeDomainOffset: offset value based on SFN=0,
timeDomainAllocation: display a start symbol, length, and PUSCH mapping type,
frequencyDomainAllocation: frequency domain allocation information,
mcsAndTBS: mcs and TBS value information used for the configured UL grant Further, valid time information of the configured UL grant to be used for the purpose of rach-skip HO for a specific time may be included. For example, a valid time may be included in absolute time units, and in this case, this information may be included in the rach-skip IE. Alternatively, the valid time information may be expressed in the maximum valid possible periodicy unit in the ConfiguredGrantConfig configuration information of a specific BWP. When expressed in absolute time units, the terminal starts the timer from the moment that the terminal receives the message received in step 1i-01, and when the timer expires, it is regarded as a HO failure. Further, when the HO is successful and the contention resolution MAC CE or the confirmation MAC CE is successfully received, the terminal may stop the timer. In the case where the maximum valid possible periodicity unit of a specific BWP is set, the terminal starts counting after synchronization with the corresponding target Pcell, and when the terminal does not receive a contention resolution MAC CE from the target PCell while passing the corresponding periodicity, it is regarded as HO failure.

The confirmation MAC CE used in the embodiment of FIGS. 1G and 1H may be classified into a MAC PDU subheader having an LCID having a specific value, and have a fixed size of 0 bit.

The embodiments of the disclosure disclosed in the present specification and drawings only present a specific example in order to easily describe the technical contents of the disclosure and to help the understanding of the disclosure, and they do not intend to limit the scope of the disclosure. That is, it will be apparent to those of ordinary skill in the art to which the disclosure pertains that other modifications can be implemented based on the technical spirit of the disclosure. Further, each of the above embodiments may be operated in combination with each other, as needed. For example, the base station and the terminal may be operated by combining parts of the embodiments of the disclosure.

Further, in the present specification and drawings, preferred embodiments of the disclosure have been disclosed, and although specific terms are used, these are only used in a general sense to easily describe the technical contents of the disclosure and to help the understanding of the disclosure, they do not intend to limit the scope of the disclosure. It will be apparent to those of ordinary skill in the art to which the disclosure pertains that other modifications based on the technical spirit of the disclosure can be implemented in addition to the embodiments disclosed herein.

The invention claimed is:

1. A method performed by a terminal in a wireless communication system, the method comprising:
  receiving, from a source base station, a first radio resource control (RRC) message for a random access channel (RACH)-less handover (HO), wherein the first RRC message includes first information for the RACH-less HO and at least one bandwidth part (BWP) configuration information including second information;
  performing an uplink transmission for the RACH-less HO using a configured uplink grant for the RACH-less HO of a specific BWP identified based on a configuration associated with the at least one BWP among the at least one BWP;
  in case that the first information is included in the first RRC message and lower layers report the RACH-less HO is successfully completed, stopping a timer; and
  based on the stopped the timer, releasing the configured uplink grant for the RACH-less HO of the specific BWP in case that the first information is included in the first RRC message and the configuration is configured,
  wherein the first information comprises target timing advance (TA) information.

2. The method of claim 1, wherein the TA information comprises Ta-0.

3. A method performed by a base station in a wireless communication system, the method comprising:
  transmitting, to a terminal, a first radio resource control (RRC) message for a random access channel (RACH)-less handover (HO), wherein the first RRC message includes first information for the RACH-less HO and at least one bandwidth part (BWP) configuration information including second information,
  wherein an uplink transmission for the RACH-less HO using a configured uplink grant for the RACH-less HO of a specific BWP is performed,
  wherein the specific BWP is identified based on a configuration associated with the at least one BWP among the at least one BWP,
  wherein the first information comprises target timing advance (TA) information,
  wherein a timer is stopped in case that the first information is included in the first RRC message and lower layers report the RACH-less HO is successfully completed, and
  wherein the configured uplink grant for the RACH-less HO of the specific BWP is released in case that the first information is included in the first RRC message and the configuration is configured.

4. The method of claim 3, wherein the TA information comprises Ta-0.

5. A terminal, comprising:
  a transceiver configured to transmit and receive at least one signal; and
  a controller coupled to the transceiver,
  wherein the controller is configured to:
    receive, from a source base station, a first radio resource control (RRC) message for a random access channel (RACH)-less handover (HO), wherein the first RRC message includes first information for the RACH-less HO and at least one bandwidth part (BWP) configuration information including second information,
    perform an uplink transmission for the RACH-less HO using a configured uplink grant for the RACH-less HO of a specific BWP identified based on a configuration associated with the at least one BWP among the at least one BWP,
    stop a timer in case that the first information is included in the first RRC message and lower layers report the RACH-less HO is successfully completed, and
    based on the stopping the timer, release the configured uplink grant for the RACH-less HO of the specific BWP in case that the first information is included in the first RRC message and the configuration is configured,
  wherein the first information comprises target timing advance (TA) information.

6. The terminal of claim 5, wherein the TA information comprises Ta-0.

7. A base station, comprising:
  a transceiver configured to transmit and receive at least one signal; and
  a controller coupled to the transceiver,
  wherein the controller is configured to:
    transmit, to a terminal, a first radio resource control (RRC) message for a random access channel (RACH)-less handover (HO), wherein the first RRC message includes first information for the RACH-less HO and at least one bandwidth part (BWP) configuration information including second information,
  wherein an uplink transmission for the RACH-less HO using a configured uplink grant for the RACH-less HO of a specific BWP is performed,
  wherein the specific BWP is identified based on a configuration associated with the at least one BWP among the at least one BWP,
  wherein the first information comprises target timing advance (TA) information,
  wherein a timer is stopped in case that the first information is included in the first RRC message and lower layers report the RACH-less HO is successfully completed, and
  wherein the configured uplink grant for the RACH-less HO of the specific BWP is released in case that the first information is included in the first RRC message and the configuration is configured.

8. The base station of claim 7, wherein the TA information comprises Ta-0.

* * * * *